United States Patent Office 3,101,355
Patented Aug. 20, 1963

3,101,355
PROCESS FOR 3-KETO-Δ⁴,⁶ STEROIDS
Albert Bowers, Esteban Volkov, and Hector Martinez, Mexico City, Mexico, assignors, by mesne assignments, to Syntex Corporation, a corporation of Panama
No Drawing. Filed Mar. 1, 1962, Ser. No. 176,823
Claims priority, application Mexico Aug. 8, 1961
10 Claims. (Cl. 260—397.4)

The present invention relates to a novel process for the production of cyclopentano phenanthrene derivatives.

More particularly the present invention relates to a novel process for the production of 3-keto-Δ⁴,⁶-derivatives of the androstane and pregnane series from the corresponding 3-enol ethers.

Several methods have been used in the past for the introduction of a double bond at the 5,6 position. Among these there has been disclosed a method which comprises treating a 3-keto steroid with a quinone in a high boiling point solvent at a temperature higher than 100° C. (Agnello and Laubach, U.S. Patent 2,882,282).

The process disclosed in this patent has several disadvantages due in part to the high temperatures used and in many instances gives relatively low yield. This is especially true when there is present in the C–6 position a halogen or methyl substituent in either the α or β positions.

In accordance with the present invention the surprising discovery has been made that 2,3-dichloro-5,6-dicyano-1,4-benzoquinone (D.D.Q.) will readily react with enol ethers derived from Δ⁴-3-keto steroids at low temperature to give quantitative yields of the corresponding Δ⁴,⁶-compounds. Further, this is true whether or not there is present a 6-substituent such as halo or lower alkyl.

The present novel process may be exemplified by the following equation:

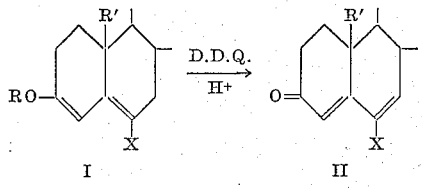

In the above equation R is a hydrocarbon residue such as alkyl, aryl or aralkyl, preferably a lower alkyl; R' may be hydrogen or methyl; X represents hydrogen or a substituent such as fluorine, chlorine, bromine or lower alkyl which are often in the C–6 position throughout the steroid art, or other less common substituents that do not hinder the reaction as for example chloromethyl, difluoromethyl, etc.

In practicing the above outlined process the 3-alkoxy-Δ³,⁵ starting steroid (I) is treated with approximately 1 molar equivalent of a benzoquinone with an oxidation potential of less than −0.75 v., preferably 2,3-dichloro-5,6-dicyano-1,4-benzoquinone, in an inert solvent, in the presence of a catalytic amount of acid, for a period of time of from about 25 minutes to about 24 hours and at a temperature ranging between −40° C. to +10° C. Examples of other quinones that may be used are: tetrachloro-ortho-benzoquinone, 2,3 - difluoro-para-benzoquinone, 2,3-dibenzoyl-para-benzoquinone, 2,3-dicyano-para-benzoquinone, and the like.

The product formed by the dehydrogenation reaction may be isolated by several methods. A convenient general first step for the various methods may be to filter off the precipitated insoluble hydroquinone formed in the reaction, although this is not necessary. In one of the methods the second step consists in diluting the filtrate with a solvent not miscible with water and subsequently washing the mixture with a dilute aqueous basic solution as for example 5% aqueous sodium hydroxide solution until the washings are colorless, which is an indication of the absence of undesired hydroquinone in the solution. Conventional working up of the organic layer such as drying, evaporation and purification of the residue affords the pure final product.

A second method of isolation consists in filtering the reaction solution as such, or diluted with a slightly polar solvent such as methylene chloride, through an adsorbing material such as alumina and subsequently eluting the product with a suitable solvent. By conventional working up the resulting solution yields the desired 3-keto-Δ⁴,⁶ steroid.

Examples of solvents that may be used in the present dehydrogenating process are: tetrahydrofuran, ether, dioxane; aromatic solvents such as: benzene, toluene and xylene; lower alkyl alcohols such as: t-butanol; chlorinated hydrocarbons such as: chloroform, methylene dichloride, ethylene dichloride and other non-basic solvents inert to the said reagent, known to the skilled in the art.

The catalytic amount of acid previously mentioned may vary from 0.001% to 10% in weight of the total reaction mixture. Acids that may be used in the present process include mineral acids and strong organic acids such as: p-toluenesulfonic acid, gaseous hydrogen chloride or bromide, acetic acid and propionic acid.

For optimum production of 3-keto-Δ⁴,⁶ steroids (II) it is preferred to use a quantity of the aforementioned quinone reagent as near as possible to 1 molar equivalent, for an amount substantially inferior would lead to the formation of mixtures of starting and final compounds, an excess reagent would produce mixtures of 3-keto-Δ⁴,⁶ and 3-keto-Δ¹,⁴,⁶ steroids.

Satisfactory yields are obtained when the reaction is carried out within the hereinbefore defined temperature and time limits, but optimum results are obtained at approximately 0° C., the duration of the reaction being of about 30 minutes.

3-alkoxy-Δ³,⁵-androstane or pregnane derivatives are in general suitable starting materials for the present dehydrogenation process. There may be present in the molecule a variety of substituents without affecting the reaction in any way. These substituents, which consequently would be present in the final products, may be, for example, at the 2, 6, 9, 11, 14, 15, 16 and 17 positions. For instance, ketonic groups may occur at the 11 and/or 20 positions, hydroxyl groups at the 9, 11, 14, 15, 16, 17 and/or 21 positions, halogen atoms at the 2, 6, 9, 11, 16, and/or 21 positions, alkyl groups at the 2, 6, 16 and/or 17 positions, double bonds at the 8, 14, 16 or 9(11) positions, etc. Among the compounds which can be prepared by the present process are: 6-chloro-Δ⁴,⁶-pregnadien-17α-ol-3,20-dione-17-acetate, 6 - chloro-Δ⁴,⁶-androstadien-17β-ol-3-one, 6-methyl-19-nor-Δ⁴,⁶-androstadien-17β-ol-3-one, Δ⁴,⁶-androstadien-17β-ol-3-one, 6-fluoro-Δ⁴,⁶-androstadien-17β-ol-3-one-17-propionate, 6 - fluoro-19-nor-Δ⁴,⁶-pregnadien-17α-ol-3,20-dione, 6-fluoro - Δ⁴,⁶ - pregnadien-17α-ol-3,20-dione, Δ⁴,⁶-pregnadien-17α-ol-3,20-dione, Δ⁴,⁶-pregnadien-17α,21-diol-3,11,20-trione, 6-fluoro-Δ⁴,⁶-pregnadien-17α,21-diol-3,11,20-trione, 6-fluoro - Δ⁴,⁶ - pregnadien-11β,17α,21-triol-3,20-dione, 6,9α - difluoro-Δ⁴,⁶-pregnadien-17α,21-diol-3,11,20-trione, 6-chloro - Δ⁴,⁶ - pregnadien-17α,21-diol-3,11,20-trione, 6-chloro - 9α - fluoro-Δ⁴,⁶-pregnadien-11β,17α,21-triol-3,20-dione-21-acetate, 6,16β- dimethyl-$\Delta^{4,6}$-pregnadien-11$\beta$,17$\alpha$,21-triol-3,20-dione and the esters of these compounds having a 21-hydroxyl group or, if a derivative of androstane or 19-nor-androstane, a 17-hydroxyl group. These esters are, for example, the benzoates, acetates, propionates, butyrates and other hydrocarbon carboxylic acylates of less than 12 carbon atoms.

Among the products which can be prepared using the process of the present invention, are important pregnane derivatives which are steroid cortical hormones with anti-inflammatory activity, such as 6-chloro-$\Delta^{4,6}$-pregnadien-17$\alpha$,21-diol-3,11,20-trione and 6,9$\alpha$-difluoro-$\Delta^{4,6}$-pregnadien-17$\alpha$,21-diol-3,11,20-trione, pregnane derivatives having progestational activity such as 6-chloro-$\Delta^{4,6}$-pregnadien-17$\alpha$-ol-3,20-dione-17-acetate and androstane derivatives which are potent anabolic agents, as for example 6-chloro-$\Delta^{4,6}$-androstadien-17$\beta$-ol-3-one and 6-fluoro-$\Delta^{4,6}$-androstadien-17$\beta$-ol-3-one.

The following specific examples serve to illustrate but are not intended to limit the scope of the present invention.

*Example 1*

A suspension of 1 g. of 6$\alpha$-chloro-$\Delta^4$-pregnen-17$\alpha$-ol-3,20-dione-17-acetate, in 7.5 cc. of anhydrous peroxide free dioxane was treated with 1.2 cc. of freshly distilled ethyl orthoformate and 0.8 g. of p-toluenesulfonic acid. The mixture was stirred at room temperature for 15 minutes and the resulting solution let stand for 30 minutes further. 0.8 cc. of pyridine were added and then water. The formed precipitate was collected by filtration, water washed and air dried. Recrystallization from acetone-hexane afforded 6-chloro-3-ethoxy-$\Delta^{3,5}$-pregnadien-17$\alpha$-ol-20-one-17-acetate with a melting point of 175–176° C.

*Example 2*

A solution of 1 g. of the foregoing 3-ethyl enol ether in 20 cc. of tetrahydrofuran was cooled to 0° C. and there were added 1.05 molar equivalents of 2,3-dichloro-5,6-dicyano-1,4-benzoquinone and 100 mg. of p-toluenesulfonic acid. The resulting mixture was further stirred at 0° C. for 30 minutes. The precipitated hydroquinone was filtered off and 100 cc. of methylene dichloride were added to the filtrate.

The organic solution was then filtered through 30 g. of alumina, the filtrate was evaporated to dryness and the residue crystallized from acetone-hexane thus furnishing the desired 6-chloro-$\Delta^{4,6}$-pregnadien-17$\alpha$-ol-3,20-dione-17-acetate in 75% yield, this compound had a melting point of 209–211° C.

*Example 3*

A solution of 1 g. of 6-chloro-3-ethoxy-$\Delta^{3,5}$-pregnadien-17$\alpha$-ol-20-one-17-acetate in 20 cc. of tetrahydrofuran was cooled to 0° C. and there were added 1.05 molar equivalents of 2,3-dichloro-5,6-dicyano-1,4-benzoquinone and 100 mg. of p-toluene-sulfonic acid. The resulting mixture was further stirred at 0° C. for 30 minutes. The precipitated hydroquinone was filtered off and 100 cc. of methylene dichloride were added to the filtrate. The organic solution was washed with 5% aqueous sodium hydroxide solution until the washings were colorless, then with water to neutrality, dried over anhydrous sodium sulfate and evaporated to dryness. Crystallization from acetone-hexane gave 6-chloro-$\Delta^{4,6}$-pregnadien-17$\alpha$-ol-3,20-dione-17-acetate, in a 76% yield.

*Example 4*

1 g. of 6-chloro-3-ethoxy-$\Delta^{3,5}$-pregnadien-17$\alpha$-ol-20-one 17-acetate was treated following the technique described in Example 3 except that the reaction was carried out at +10° C. for 25 minutes thus furnishing 6-chloro-$\Delta^{4,6}$-pregnadien-17$\alpha$-ol-3,20-dione-17-acetate, in 70% yield.

*Example 5*

1 g. of 6-chloro-3-ethoxy-$\Delta^{3,5}$-pregnadien-17$\alpha$-ol-20-one-17-acetate was treated by the procedure described in Example 3 except that the reaction was made at −20° C. during 3 hours giving 6-chloro-$\Delta^{4,6}$-pregnadien-17$\alpha$-ol-3,20-dione-17-acetate, in 70% yield.

*Example 6*

1 g. of 6-chloro-3-ethoxy-$\Delta^{3,5}$-pregnadien-17$\alpha$-ol-20-one-17-acetate was treated in accordance with the procedure delineated in Example 3 except that the reaction occurred at −40° C. for 24 hours affording 6-chloro-$\Delta^{4,6}$-pregnadien-17$\alpha$-ol-3,20-dione-17-acetate, in 50% yield.

*Example 7*

In accordance with the method described in Example 2 except that tetrahydrofuran was substituted by methylene chloride, there was obtained the same product in 74% yield.

*Example 8*

By substituting tetrahydrofuran by toluene in Example 3 there was obtained the desired product in 75% yield.

*Example 9*

According to the method described in Example 4 except that tetrahydrofuran was substituted by dioxane, there was obtained the same product in 75% yield.

*Example 10*

1 g. of 6-chloro-3-ethoxy-$\Delta^{3,5}$-pregnadien-17$\alpha$-ol - 20-one-17-acetate was treated following the procedure described in Example 3 except that instead of adding 100 mg. of p-toluene-sulfonic acid to the reaction mixture, there was passed a current of gaseous hydrogen chloride during 30 seconds thus yielding 6-chloro-$\Delta^{4,6}$-pregnadien-17$\alpha$-ol-3,20-dione-17-acetate in 74% yield.

*Example 11*

The $\Delta^4$-3-ketones listed below were converted into the corresponding 3-enol ethers hereinafter set forth, following the technique described in Example 1 and using the indicated alkyl orthoformate.

| Starting compound | alkyl orthoformate | Product |
| --- | --- | --- |
| 6$\alpha$-chloro-testosterone | methyl orthoformate | 6-chloro-3-methoxy-$\Delta^{3,5}$-androstadien-17$\beta$-ol. |
| 6$\alpha$-chloro-19-nor-testosterone | ethyl orthoformate | 6-chloro-3-ethoxy-19-nor-$\Delta^{3,5}$-androstadien-17$\beta$-ol. |
| 6$\alpha$-methyl-19-nor-testosterone | propyl orthoformate | 6-methyl-3-propoxy-19-nor-$\Delta^{3,5}$-androstadien-17$\beta$-ol. |
| Testosterone | ethyl orthoformate | 3-ethoxy-$\Delta^{3,5}$-androstadien-17$\beta$-ol. |
| 6$\alpha$-fluoro-testosterone-17-proprionate (U.S. Pat. 2,838,492). | methyl orthoformate | 6-fluoro-3-methoxy-$\Delta^{3,5}$-androstadien-17$\beta$-ol-17-propionate. |
| 6$\alpha$-fluoro-17$\alpha$-hydroxy-19-nor-progesterone (U.S. Pat. 2,838,495). | propyl orthoformate | 6-fluoro-3-propoxy-19-nor-$\Delta^{3,5}$-pregnadien-17$\alpha$-ol-20-one. |
| 6$\beta$-fluoro-17$\alpha$-hydroxy-progesterone (U.S. Pat. 2,838,496). | methyl orthoformate | 6-fluoro-3-methoxy-$\Delta^{3,5}$-pregnadien-17$\alpha$-ol-20-one. |
| Progesterone | ethyl orthoformate | 3-ethoxy-$\Delta^{3,5}$-pregnadien-17$\alpha$-ol-20-one. |
| Cortisone | methyl orthoformate | 3-methoxy-$\Delta^{3,5}$-pregnadien-17$\alpha$, 21-diol-11, 20-dione. |
| 6$\alpha$-fluoro-cortisone (U.S. Pat. 2,838,497). | ethyl orthoformate | 6-fluoro-3-ethoxy-$\Delta^{3,5}$-pregnadiene-17$\alpha$, 21-diol-11, 20-dione. |
| 6$\beta$-fluoro-hydrocortisone (U.S. Pat. 2,838,497). | propyl orthoformate | 6-fluoro-3-propoxy-$\Delta^{3,5}$-pregnadiene-11$\beta$, 17$\alpha$, 21-triol-20-one. |
| 6$\alpha$, 9$\alpha$-difluorocortisone (U.S. Pat. 2,838,498). | methyl orthoformate | 6, 9$\alpha$-difluoro-3-methoxy-$\Delta^{3,5}$-pregnadiene-17$\alpha$, 21-diol-11, 20-dione. |
| 6$\beta$-chloro-cortisone (Ringold et al., JACS 80, 6464 (1958)). | ethyl orthoformate | 6-chloro-3-ethoxy-$\Delta^{3,5}$-pregnadiene-17$\alpha$,21-diol-11,20-dione. |
| 6$\alpha$-chloro-9$\alpha$-fluorohydrocortisone - 21 - acetate (Ringold et al., JACS 80, 6464 (1958)). | propyl orthoformate | 6-chloro-9$\alpha$-fluoro-3-propoxy-$\Delta^{3,5}$-pregnadien-11$\beta$, 17$\alpha$,21-triol-20-one-21-acetate. |
| 6$\alpha$,16$\beta$-dimethyl-hydrocortisone. | ethyl orthoformate | 6,16$\beta$-dimethyl-3-ethoxy-$\Delta^{3,5}$-pregnadiene-11$\beta$,17$\alpha$, 21-triol-20-one. |

*Example 12*

Following the technique described in Example 3 there were treated the 3-enol ethers set forth below, yielding the corresponding products hereinafter disclosed.

| Starting compounds | Products |
|---|---|
| 6-chloro-3-methoxy-$\Delta^{3,5}$-androstadien-17$\beta$-ol. | 6-chloro-$\Delta^{4,6}$-androstadien-17$\beta$-ol-3-one. |
| 6-chloro-3-ethoxy-19-nor-$\Delta^{3,5}$-androstadien-17$\beta$-ol. | 6-chloro-19-nor-$\Delta^{4,6}$-androstadien-17$\beta$-ol-3-one. |
| 6-methyl-3-propoxy-19-nor-$\Delta^{3,5}$-androstadien-17$\beta$-ol. | 6-methyl-19-nor-$\Delta^{4,6}$-androstadien-17$\beta$-ol-3-one. |
| 3-ethoxy-$\Delta^{3,5}$-androstadien-17$\beta$-ol. | $\Delta^{4,6}$-androstadien-17$\beta$-ol-3-one. |
| 6-fluoro-3methoxy-$\Delta^{3,5}$-androstadien-17$\beta$-ol-17-propionate | 6-fluoro-$\Delta^{4,6}$-androstadien-17$\beta$-ol-3-one-17-propionate. |
| 6-fluoro-3-propoxy-19-nor-$\Delta^{3,5}$-pregnadien-17$\alpha$-ol-20-one. | 6-fluoro-19-nor-$\Delta^{4,6}$-pregnadien-17$\alpha$-ol-3,20-dione. |
| 6-fluoro-3-methoxy-$\Delta^{3,5}$-pregnadien-17$\alpha$-ol-20-one. | 6-fluoro-$\Delta^{4,6}$-pregnadien-17$\alpha$-ol-3,20-dione. |
| 3-ethoxy-$\Delta^{3,5}$-pregnadien-17$\alpha$-ol-20-one. | $\Delta^{4,6}$-pregnadien-17$\alpha$-ol-3,20-dione. |
| 3-methoxy-$\Delta^{3,5}$-pregnadiene-17$\alpha$,21-diol-11,20-dione. | $\Delta^{4,6}$-pregnadien-17$\alpha$,21-diol-3,11,20-trione. |
| 6-fluoro-3-ethoxy-$\Delta^{3,5}$-pregnadiene-17$\alpha$,21-diol-11,20-dione. | 6-fluoro-$\Delta^{4,6}$-pregnadien-17$\alpha$,21-diol-3,11,20-trione. |
| 6-fluoro-3-propoxy-$\Delta^{3,5}$-pregnadiene-11$\beta$,17$\alpha$,21-triol-20-one. | 6-fluoro-$\Delta^{4,6}$-pregnadien-11$\beta$,17$\alpha$,21-triol-3,20-dione. |
| 6,9$\alpha$-difluoro-3-methoxy-$\Delta^{3,5}$-pregnadiene-17$\alpha$,21-diol-11,20-dione. | 6,9$\alpha$-difluoro-$\Delta^{4,6}$-pregnadien-17$\alpha$-21-diol-3,11,20-trione. |
| 6-chloro-3-ethoxy-$\Delta^{3,5}$-pregnadiene-17$\alpha$,21-diol-11,20-dione. | 6-chloro-$\Delta^{4,6}$-pregnadien-17$\alpha$,21-diol-3,11,20-dione. |
| 6-chloro-9$\alpha$-fluoro-3-propoxy-$\Delta^{3,5}$-pregnadiene-11$\beta$,17$\alpha$,21-triol-20-one-21-acetate. | 6-chloro-9$\alpha$-fluoro-$\Delta^{4,6}$-pregnadien-11$\beta$,17$\alpha$,21-triol-3,20-dione-21-acetate. |
| 6,16$\beta$-dimethyl-3-ethoxy-$\Delta^{3,5}$-pregnadiene-11$\beta$,17$\alpha$, 21-triol-20-one. | 6,16$\beta$-dimethyl-$\Delta^{4,6}$-pregnadien-11$\beta$, 17$\alpha$, 21-triol-3,20-dione. |

*Example 13*

1. g of. 6-chloro-3-ethoxy-$\Delta^{3,5}$-pregnadien-17$\alpha$-ol-20-one-17-acetate was treated in accordance with the procedure described in Example 2, except that 2,3-dichloro-5,6-dicyano-1,4-benzoquinone was substituted by tetrachloro-ortho-benzoquinone, thus yielding 6-chloro-$\Delta^{4,6}$-pregnadien-17$\alpha$-ol-3,20-dione-17-acetate, in 65% yield.

*Example 14*

1 g. of 6-chloro-3-ethoxy-$\Delta^{3,5}$-pregnadien-17$\alpha$-ol-20-one-17-acetate was treated in accordance with Example 3, except that 2,3-dichloro-5,6-dicyano-1,4 - benzoquinone was substituted by 2,3-dicyano-para-benzoquinone, thus giving 6-chloro-$\Delta^{4,6}$-pregnadien-17$\alpha$-ol-3,20-dione-17-acetate, in 69% yield.

*Example 15*

1 g. of 6-chloro-3-ethoxy-$\Delta^{3,5}$-pregnadien-17$\alpha$-ol-20-one-17-acetate was treated in accordance with Example 2, but 2,3-difluoro-para-benzoquinone was used instead of 2,3-dichloro-5,6-dicyano-1,4-benzoquinone, thus furnishing 6-chloro-$\Delta^{4,6}$-pregnadien-17$\alpha$-ol-3,20-dione-17-acetate, in 64% yield.

*Example 16*

6-chloro-3-ethoxy-$\Delta^{3,5}$-pregnadien-17$\alpha$-ol-20 - one - 17-acetate was treated according to Example 3, except that 2,3-dichloro-5,6-dicyano-1,4-benzoquinone was substituted by 2,3-dibenzoyl-para-benzoquinone, thus affording 6-chloro-$\Delta^{4,6}$-pregnadien-17$\alpha$-ol-3,20-dione-17 - acetate in 62% yield.

We claim:

1. A process for the production of 3-keto-$\Delta^{4,6}$-steriods selected from the group consisting of the androstane and pregnane series which comprises treating a 3-enol ether-$\Delta^{3,5}$-steroid with a benzoquinone with an oxidation potential of less than —0.75, in a solvent inert to the reagent and in the presence of a catalytic amount of acid to form the corresponding 3-keto-$\Delta^{4,6}$-steroid.

2. The process of claim 1 wherein the amount of said benzoquinone is approximately 1 molar equivalent.

3. The process of claim 1 wherein the inert solvent is selected from the group consisting of aromatic solvents.

4. The process of claim 1 wherein the inert solvent is selected from the group consisting of chlorinated lower hydrocarbons.

5. The process of claim 1 wherein the inert solvent is tetrahydrofuran.

6. A process for the production of 3-keto-$\Delta^{4,6}$-steroids selected from the group consisting of the androstane and pregnane series which comprises treating a 3-enol ether-$\Delta^{3,5}$-steroid with a benzoquinone with an oxidation potential of less than —0.75, in an inert solvent and in the presence of a catalytic amount of acid for a period of time of from about 25 minutes to about 24 hours at a temperature within —40° C. to +10° C. to form the corresponding 3-keto-$\Delta^{4,6}$-steroid.

7. The process of claim 6 wherein the inert solvent is tetrahydrofuran, the period of time is of around 30 minutes and the temperature is approximately 0° C.

8. The process of claim 6 wherein the benzoquinone is 2,3-dichloro-5,6-dicyano-1,4-benzoquinone.

9. The process of claim 7 wherein the benzoquinone is 2,3-dichloro-5,6-dicyano-1,4-benzoquinone.

10. The process of claim 9 wherein the starting steroid is 6-chloro-3-ethoxy-$\Delta^{3,5}$-pregnadien-17$\alpha$-ol-20-one - 17-acetate and the final 3-keto-$\Delta^{4,6}$-steroid is 6-chloro-$\Delta^{4,6}$-pregnadien-17$\alpha$-ol-3,20-dione-17-acetate.

No references cited.